Figure 1:
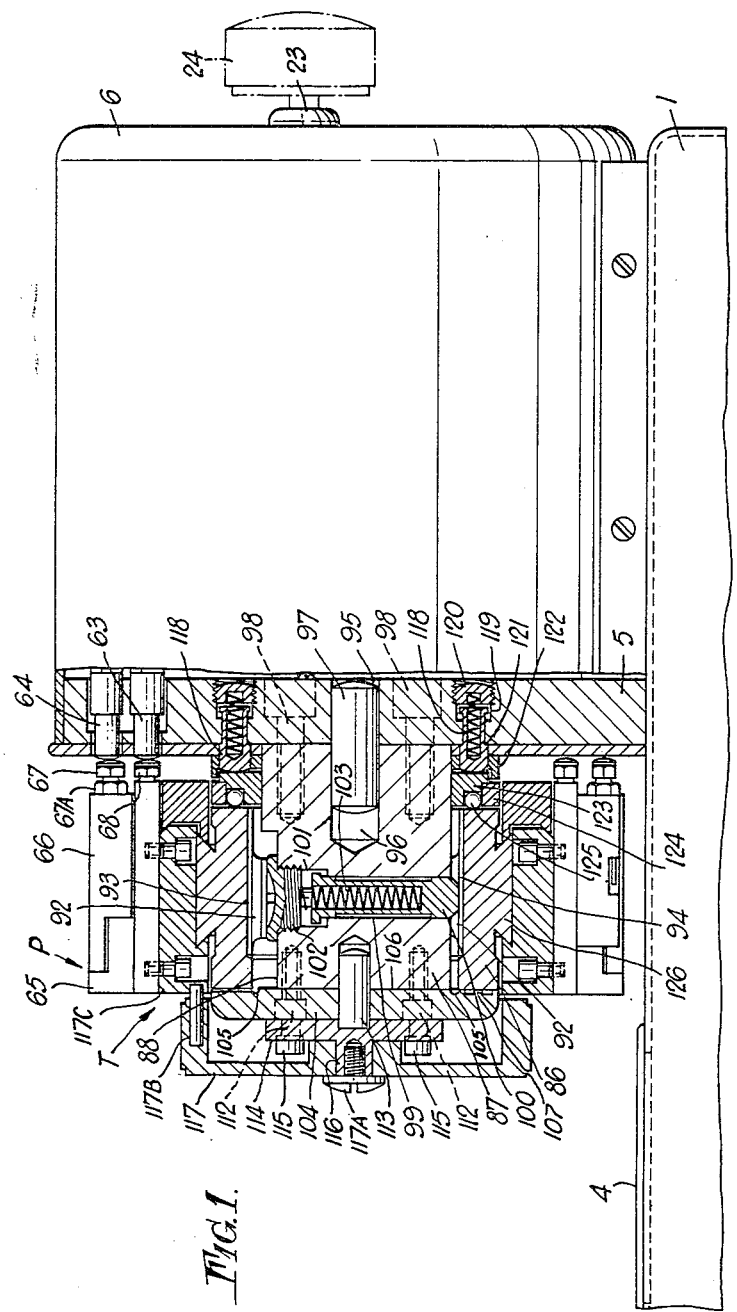

Dec. 18, 1956   J. LOXHAM   2,774,147
MEANS FOR AXIALLY LOCATING A ROTATABLE SLEEVE ON A PIN
Filed May 29, 1953   3 Sheets-Sheet 1

United States Patent Office
2,774,147
Patented Dec. 18, 1956

2,774,147

MEANS FOR AXIALLY LOCATING A ROTATABLE SLEEVE ON A PIN

John Loxham, Letchworth, England, assignor to The Sigma Instrument Company Limited, Letchworth, England, a British company Application May 29, 1953, Serial No. 358,489

6 Claims. (Cl. 33—181)

This invention relates to means for axially locating a rotatable sleeve on a pin, and is applicable for axially locating a turret sleeve upon the turret pin of a turret comparator. A turret comparator is employed for checking several dimensions of a work-piece, each such dimension being gauged between the reference and gauging anvils of a separate gauging fixture adapted for checking that dimension. The gauging fixtures are secured around the exterior of the turret sleeve which can be rotated about the fixed turret pin to bring the fixtures consecutively to a particular location in regard to the measuring apparatus of the comparator. The measuring apparatus serves to measure and indicate the displacement of the gauging anvil of each fixture in relation to the reference anvil thereof, whilst the work-piece is held between said reference and gauging anvils at the region of the dimension of the work-piece associated with the gauging fixture concerned.

It will be appreciated that both the diametral location and the axial location of the turret sleeve upon its pin can be of great importance in the obtaining of consistent accuracy in the indications of the measuring apparatus when the latter cooperates consecutively with the several gauging fixtures mounted upon the rotatable turret sleeve.

As already indicated, the invention is of particular value in regard to the obtaining of the axial location of a turret sleeve upon its pin. It will, however, be appreciated that the invention is generally applicable for the axial location of any other sleeve upon a pin or shaft. In the following description and claims, reference will be made to "a turret sleeve" and to a "pin" or "turret pin" which terms should be read broadly if the context permits, so as to include a sleeve similar to a turret sleeve and a spigot or shaft equivalent to a turret pin.

In accordance with the invention there is provided means for obtaining axial location of a rotatable turret sleeve on a turret pin, comprising a flange-like termination at one end of the pin having a reference face for engaging one end face of the sleeve, said one end face (or said reference face) being contained in a plane that is truly perpendicular to the axis of rotation of the rotatable turret sleeve, a plurality of spaced pads projecting from said reference face (or said one end face as the case may be) and having reference surfaces for contacting said one end face (or said reference face), said reference surfaces lying truly in a plane parallel to the first-mentioned plane, and means for resiliently pressing together said one end face and said reference face.

The means for obtaining axial location set forth above, may be combined with means for securing diametral location of the turret sleeve upon the turret pin.

Figure 2:
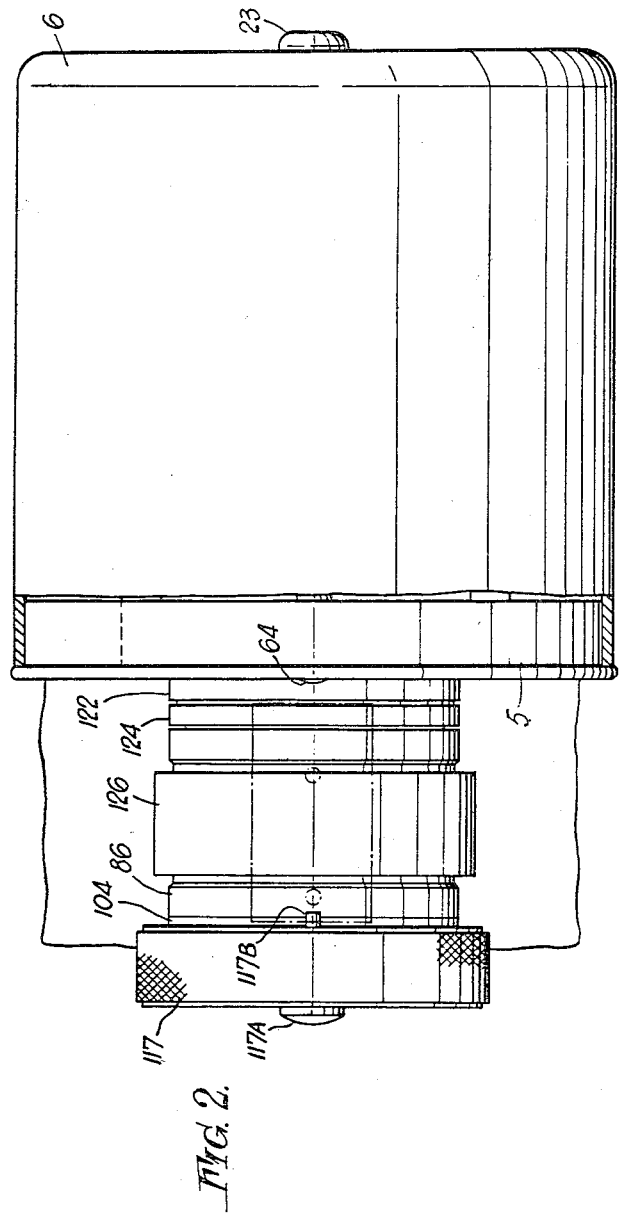
Figure 3:
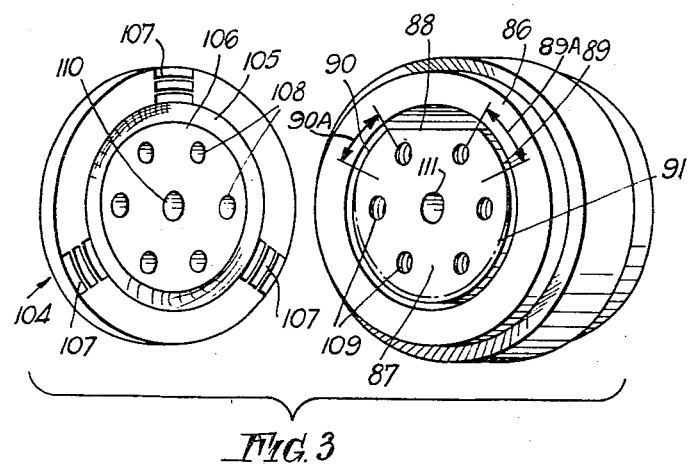

For a better understanding of the invention and to show how the same may be carried into effect, reference will now be made to the accompanying drawings in which:

Figure 1 is a side view of a turret comparator with the turret mechanism in section, Figure 2 is a corresponding plan view, and Figure 3 is an isometric view of two cooperating parts of the mechanism shown in the other figures.

Referring now to the drawings, the turret comparator has an indicating galvanometer contained in a base casing 1 from the upper side of which there is raised an upright plate 5. The rear side of the plate 5 serves as a closure for a housing 6 in which is included the measuring apparatus whose measurements are indicated by the galvanometer in the base casing 1. The front side of the upright 5 has displaceable finger elements 63 and 64 projecting from it, the element 64 being intended to move in accordance with gauging displacements whilst the finger element 63 moves in accordance with reference displacements.

The turret T will now be described. The turret essentially consists of a sleeve 86 rotatably mounted on a pin 87 extending forwardly from the upright 5, as seen in Figure 1. In Figure 3 there is shown a perspective view of the sleeve 86 and the pin 87. The latter is formed from a bar of circular section. The top portion of the bar is cut away to form a horizontal flat as at 88 (Figures 1 and 3). The surface of the lower half of the bar is ground away slightly to leave two, angularly spaced, axially extending original surface portions 89 and 90. The angular extent of these two portions 89, 90 is indicated by dimension lines 89A, 90A. Only a relatively small amount of the exterior lower surface of the bar is ground away, and therefore in order to exaggerate the drawing to the extent that the grinding-away shall be noticeable, a chain-dotted line has been inserted in Figure 3 at 91 to show with exaggeration the profile of the bar after grinding. For a bar which was originally of truly circular section of about 3 inches in diameter, the maximum amount ground away at the bottom of the bar is between 5 to 10 thousandths of an inch, decreasing towards the upper half of the bar to zero to one-thousandth of an inch. From these dimensions it will be appreciated that the profile shown by the line 91 represents a very considerable exaggeration.

The sleeve 86 is formed initially with an internal diameter equal to the external diameter of the bar from which the pin 87 was formed. The interior of the sleeve is relieved to form a land 92 (Figure 1) the internal diameter of which is, of course, the original internal diameter of the sleeve. The internal land 92 is interrupted by the formation of axially extending grooves, two of which are seen at 93 and 94. There are ten such grooves equi-angularly spaced around the land 92. Hence each groove is thirty-six degrees distant from the next adjacent groove. In the section shown in Figure 1, the plane of the section has passed through the top groove 93 and hence the land 92 does not appear in section. In the same way the plane of the section has passed through the groove 94 and again the land 92 appears in full.

It is of importance to ensure that the pin 87 projects from the upright 5 in such a manner that the axis of the pin is truly perpendicular to the face of the upright. In order to achieve this, a hole 95 is formed in the upright, in such a way that the axis of the hole is truly perpendicular to the face of the upright, whilst a truly axial hole 96 is made in the pin. A heavy pin 97 lies in the holes 95 and 96 and ensures that they are correctly aligned. Fixing screws 98 attach the pin securely to the upright.

The pin 87 has a diametrally extending bore 99 accommodating a hollow plunger 100. The bore is shouldered as at 101 and receives screw-threadedly a closing cap 102. The latter receives one end of a compression spring 103 housed in the hollow plunger 100. The external tip of the plunger 100 is accommodated in the groove 94. If the sleeve 86 is rotated on its pin, the tip of the plunger 100 successively enters the several axial grooves in the land 92. Thus the plunger serves to hold the sleeve in any one of ten angular positions of adjustment around the fixed pin 87. The plunger 100 not only serves to define the ten distinct positions of angular adjustment of the sleeve 86, but also serves for the diametral location of the sleeve upon the pin. As will be understood, it is only the longitudinally extending surface portions 89, 90 which fit within the circular land 92. The plunger end 100 pushes downwardly upon the sleeve 86 and thus correctly draws the sleeve into contact with the pin upon the portions 89 and 90. It is, of course, equally important that the sleeve 86 should be correctly axially located upon the pin. The means for axial location will now be described.

The outer end of the pin 87 (i. e. the end seen in Figure 3) receives a cap plate 104. The end face of the pin 87 is made flat to a high degree of accuracy and lies in a plane that is truly perpendicular to the axis of the pin. The corresponding face of the cap plate 104 is also made flat to a high degree of accuracy. A groove 105 is formed in the flat face of the cap so as to leave a central portion 106 for engagement upon the end face of the pin. Beyond the groove 105, the face (said corresponding face) is mainly ground away to leave three equi-angularly spaced pads 107, these pads having truly co-planar reference surfaces being part of the original surface before the grinding was performed which produced the pads. The amount of such grinding is slight so that the height of the pads is only a few thousandths of an inch. The height of the pads as shown in Figures 1 and 3 is greatly exaggerated for the purposes of explanation. Preferably the pads are each grooved for reasons concerned with lubrication. Six holes 108 are formed in the cap plate 104 and there are six corresponding tapped holes 109 in the pin end face. There is a central hole 110 in the cap plate and a corresponding hole 111 is formed in the pin face. Both the holes 110 and 111 are accurately formed to ensure that they can register co-axially, the axis being truly perpendicular to the prepared end face of the pin and the flat central face portion 106 of the cap plate. Three counter-sunk screws 112 (see Figure 1) are entered appropriately in holes 108 and engage in holes 109. An accurately formed register pin 113 lies in the holes 110 and 111. A disc 114 is placed over the cap plate 104 and is held by screws 115 which pass through holes in the disc and which pass through holes 108 and are entered in holes 109 in the pin. The disc 114 has a hollow axial extension 116 for reception of a manual control head 117, the latter having a central boss fitting over the axial extension 116. The control head 117 is held in position by a screw 117A entering the hollow of the extension 116, such hollow being internally screw-threaded for this purpose. It is to be understood that the control head 117 is free to turn upon the axial extension 116. A pin 117B extends from the control head 117 and is entered in a hole formed for this purpose in one of the gauging fixture clamping blocks 117C. Thus by gripping the head 117, the turret sleeve 86 can be turned about the pin 87 to bring any of the gauging fixtures secured upon the turret into register with the fingers 63 and 64 of the measuring apparatus. It will suffice for the present description to indicate that the several gauging fixtures disposed upon the turret sleeve each comprises elementally a clamping block 117C, a fixed anvil 65 and a moving anvil 66. The latter has a screw entered in it with a hardened and polished head 67. A lock-nut 67A permits the screw to be fixedly held in various positions of adjustment of the head 67, with respect to the movable anvil 66. The fixed anvil 65 has a similar head 68. A part to be gauged can be inserted at P (Figure 1) by moving the anvil 66 to the right. Movement of the anvil 66 in this way will cause the finger 64 to be correspondingly displaced, whilst the finger 63 remains unmoved. The finger 63 is thus for reference and the finger 64 for gauging, as previously indicated hereinbefore. The measuring apparatus in the housing 6 serves to measure the difference in displacements imparted to the fingers 63 and 64.

The upright 5 is drilled in several places for the reception of hollow plungers two of which may be seen at 118 in Figure 1. All the plungers 118 are arranged in the same manner and it will therefore suffice to describe one. The hole in which the plunger is received in the upright 5 is shouldered as at 119, and is internally screw-threaded for the reception of a threaded cap 120. One end of a spring 121 seats against the cap 120, the spring being contained in the hollow of the plunger. Each plunger projects through the upright 5 and through an aperture formed in a dished circular plate 122. The dished plate 122 receives an annular member 123 which is stepped for the reception of a ring 124. The ring 124 is secured to the annular member 123 so that between them there is formed a raceway for balls 125. The balls 125 engage the adjacent side face of the sleeve 86. This side face of the sleeve is made flat to a high degree of accuracy and lies in a plane which is truly perpendicular to the axis of the sleeve. The other side face of the sleeve 86 is likewise truly flat and perpendicular to the sleeve axis. Such other side face engages the three pads 107. The side face that engages the pads 107 must be of particular accuracy in regard to its flatness and its location in a plane perpendicular to the axis of the sleeve.

It will now be appreciated that axial location of the sleeve 86 is obtained by pressing the same against the pads 107 of the cap plate through the intermediary of the balls 125, the race-track of which is resiliently pressed towards the sleeve by the plungers 118.

It will be appreciated that when the cap plate 104 is bolted to the end face of the pin, the reference face portion 106 may be considered as being integral with the end face of the pin 87. The peripheral portion of the reference face of the cap plate 104 can thus be considered as fully equivalent to a flange-like projection from the end of the spigot itself, the pads 107 affording coplanar reference surfaces against which the adjacent end face of the turret sleeve 86 is resiliently pressed through the intermediary of the balls 125.

In use of the comparator, the gauging fixture appropriate to the work-piece dimension to be checked is brought to the uppermost position on the turret by turning the sleeve 86 about the pin 87, so that the heads 67 and 68 of the fixture register with the fingers 63, 64 of the measuring apparatus. The work-piece is inserted at P and the anvil 66 is displaced causing movement to be transmitted to the measuring apparatus via the head 67 and the finger 64. The correctness or otherwise of the gauged dimension is indicated by the galvanometer contained in the base casing 1.

I claim:

1. In combination a pin, a sleeve rotatably mounted on the pin, a cap plate carried on an end of the pin, peripheral portions of the plate projecting radially beyond the periphery of the pin, a first face on the sleeve and adjacent said peripheral portions, a second face on the peripheral portions and adjacent said sleeve, angularly spaced pads projecting from one of said faces towards the other of said faces, reference surfaces on said pads for contacting said other face, said reference surfaces and said other face being perpendicular to the axis of rotation of the sleeve about the pin, and means for resiliently pressing together said other face and said reference surfaces.

2. In combination a pin, a sleeve rotatably mounted on the pin for rotation about the axis of the pin, a cap plate secured on an end of the pin, portions of the cap plate projecting radially beyond the periphery of the pin, angularly spaced pads projecting from said portions towards said sleeve, reference surfaces on said pads, said surfaces being perpendicular to said axis, a face on said sleeve contacting said reference surfaces, said face being perpendicular to said axis, and means resiliently pressing together said face and said surfaces.

3. In combination a pin, a sleeve rotatably mounted on said pin for rotation about the axis of the pin, a first face on the pin, said first face being perpendicular to the axis of the pin, a cap plate, a flat surface on the cap plate, the truly flat surface being held against said end face, portions of the cap plate projecting radially from the periphery of the pin, there being angularly spaced relieved parts around said portions whereby a pad is formed between adjacent relieved parts, each pad having a reference surface which is part of said flat surface, a second face on said sleeve, said second face being perpendicular to the axis of the sleeve, and means resiliently pressing together the second face and the reference surfaces.

4. A combination according to claim 3, wherein the pads are three in number and are spaced equi-angularly about said axis.

5. A combination as claimed in claim 3, wherein each pad is gapped for lubrication purposes.

6. A combination as claimed in claim 3, wherein the resilient means comprises an annular trackway around the pin and adjacent that face of the sleeve that is opposite said second face, balls in the trackway and contacting the sleeve, and spring means pressing against the trackway to hold the balls resiliently against said sleeve.

References Cited in the file of this patent

UNITED STATES PATENTS

| | | |
|---|---|---|
| 2,341,284 | Payne | Feb. 8, 1944 |
| 2,350,436 | Whistler et al. | June 6, 1944 |
| 2,377,965 | Rataiczak | June 12, 1945 |
| 2,616,184 | Mendro et al. | Nov. 4, 1952 |